United States Patent
Sato et al.

(10) Patent No.: US 8,440,338 B2
(45) Date of Patent: May 14, 2013

(54) BATTERY ASSEMBLING BODY AND VEHICLE ON WHICH BATTERY ASSEMBLING BODY IS MOUNTED

(75) Inventors: Kazuo Sato, Wako (JP); Eisuke Komazawa, Wako (JP); Takeshi Fujino, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 831 days.

(21) Appl. No.: 12/320,260

(22) Filed: Jan. 22, 2009

(65) Prior Publication Data

US 2009/0191451 A1    Jul. 30, 2009

(30) Foreign Application Priority Data

Jan. 25, 2008  (JP) .................... 2008-014472

(51) Int. Cl.
  *H01M 2/12*   (2006.01)
  *H01M 2/36*   (2006.01)
  *H01M 10/50*   (2006.01)
  *H01M 6/42*   (2006.01)
  *H02J 7/00*   (2006.01)

(52) U.S. Cl.
  USPC ............ 429/71; 429/72; 429/120; 429/149; 320/103

(58) Field of Classification Search .............. 429/71, 429/72, 120, 149; 320/103
  See application file for complete search history.

(56) References Cited

U.S. PATENT DOCUMENTS

| | | | | |
|---|---|---|---|---|
| 5,800,942 | A * | 9/1998 | Hamada et al. | 429/148 |
| 6,094,927 | A * | 8/2000 | Anazawa et al. | 62/239 |
| 7,559,389 | B2 * | 7/2009 | Yamashita | 180/65.31 |

FOREIGN PATENT DOCUMENTS

JP    2007-186200    7/2007

* cited by examiner

*Primary Examiner* — Patrick Ryan
*Assistant Examiner* — Julian Anthony
(74) *Attorney, Agent, or Firm* — Squire Sanders (US) LLP

(57) ABSTRACT

A battery assembling body capable of preventing a temperature rise of a battery while preventing an inflow of foreign matters. The battery assembling body (12) includes a housing (15) which contains batteries (2a, 2b, 6), a side frame (17) which is used to detachably fit the housing (15) to a lower frame of a vehicle, a ventilation hole (18c) located upper part of the housing (15), and a ventilation space (24a, 24b) which is formed between the housing (15) and the batteries, and the ventilation space (24, 24b) is in communication with the ventilation hole (18c).

10 Claims, 5 Drawing Sheets

BATTERY ASSEMBLING BODY AND VEHICLE ON WHICH BATTERY ASSEMBLING BODY IS MOUNTED

BACKGROUND OF THE INVENTION

1. Field of the Invention

The present invention relates to a battery assembling body which is used to detachably mount a battery on a lower part of a vehicle and a vehicle on which the battery assembling body is mounted.

2. Related Background Art

Conventionally, there is known a battery (secondary battery) mounted on a vehicle that is collectively disposed in an area under the rear seat, for example, as shown in FIG. 2 of Japanese Patent Application Laid-Open No. 2007-186200.

The battery, however, needs maintenance on a regular basis and therefore is required to be a structure independently of the vehicle and to be easily attachable and detachable to and from the vehicle.

In this regard, the battery which is the structure independently of the vehicle has a problem that foreign matters such as water and dust may flow into the battery from the mounted position.

On the other hand, the battery is one of heat sources having a large heat amount and therefore it is absolutely necessary to cool down the battery to maintain the performance thereof. If the battery is enclosed to prevent the inflow of the foreign matters such as water and dust, however, a cooling efficiency decreases and a temperature rise occurs in the battery problematically.

SUMMARY OF THE INVENTION

Therefore, it is an object of the present invention to provide a battery assembling body capable of suppressing a temperature rise of a battery while preventing an inflow of foreign matters and a vehicle on which the battery assembling body is mounted.

To achieve the above object, according to a first invention, there is provided a battery assembling body, comprising: a battery; a housing which contains the battery and is disposed in an internal space in a lower part of a vehicle into which an outside air is likely to flow; an assembling part which is used to detachably fit the housing into the internal space; a ventilation hole located upper part of the housing; and a ventilation space which is formed between the housing and the battery contained in the housing, wherein the ventilation space is in communication with the ventilation hole.

According to the battery assembling body of the first invention, the ventilation hole is provided in the housing containing the battery, the ventilation hole is in communication with the internal space in the lower part of the vehicle, and the ventilation space is formed between the battery and the housing. Therefore, it is possible to supply the ventilation space with the outside air which flows into the internal space as a cooling medium to cool down the battery. Further, the ventilation hole is located upper part of the housing, and therefore even if foreign matters such as a very small amount of water or dust flows into the internal space from the assembling part or from the vicinity thereof so as to be likely to come in contact with the housing, the foreign matter is unlikely to reach the upper part of the housing, thereby preventing the foreign matter from coming in contact with the battery after flowing into the housing. More specifically, it is possible to suppress a temperature rise of the battery while preventing the inflow of the foreign matter into the battery.

A battery assembling body of a second invention further comprises a gap forming member which forms a gap, as a part of the ventilation space, between the battery contained in the housing and the lower part of the housing in the battery assembling body of the first invention.

According to the battery assembling body of the second invention, it is possible to form a ventilation space, into which an outside air flows as a cooling medium, in a portion lower than the battery while maintaining sealability of the lower part of the housing to the outside. Therefore, as described above, the ventilation hole is located upper part of the housing, thereby preventing the foreign matters from flowing into the battery and enabling the battery to be cooled down by the flow of the outside air between the upper portion and the lower portion of the battery.

A battery assembling body of a third invention is characterized in that the battery includes a secondary battery unit composed of a plurality of secondary batteries connected to each other and a capacitor composed of a plurality of capacitor cells connected to each other and that a partition is inserted between the secondary battery unit and the capacitor adjacent to each other and one or both of an orifice and a vent groove are formed in the partition as a part of the ventilation space, in the battery assembling body of the first or second invention.

According to the battery assembling body of the third invention, it is possible to transmit the heat of the secondary battery unit generally having a large heat amount caused by charging and discharging to the capacitor, thereby enabling the secondary battery unit to be cooled down. Further, the orifice or vent groove is provided as a ventilation space in the partition between the secondary battery unit and the capacitor, thereby enabling cooling down the battery by the outside air passing through the orifice or vent groove. Therefore, as described above, the provision of the ventilation hole located upper part of the housing prevents the inflow of foreign matters into the battery and enables the battery to be cooled down.

A battery assembling body of a fourth invention is characterized in that a vent groove is formed as a part of the ventilation space in a side wall of the housing in contact with the side of the battery in one of the battery assembling bodies of the first to third inventions.

According to the battery assembling body of the fourth invention, the vent groove is provided in the side wall in contact with the side of the battery as the ventilation space, thereby enabling the battery to be cooled down by the outside air passing through the vent groove. Therefore, as described above, the provision of the ventilation hole located upper part of the housing prevents the inflow of foreign matters to the battery and enables the battery to be cooled down.

A battery assembling body of a fifth invention further comprises a fan which induces an inflow of an outside air to the ventilation space in one of the battery assembling bodies of the first to fourth inventions.

According to the battery assembling body of the fifth invention, the fan enables the outside air to flow into the ventilation space in a positive manner, thereby enabling improvement of the cooling effect of the outside air. Therefore, as described above, the provision of the ventilation hole located upper part of the housing prevents the inflow of foreign matters to the battery and enables improvement of cooling efficiency of the battery.

In order to achieve the above object, according to a sixth invention, there is provided a vehicle on which one of the battery assembling bodies according to the first to fifth inventions is mounted, wherein the internal space is formed under a seat of the vehicle and at an end of a center tunnel extending in an anteroposterior direction in the center of the vehicle, with the ventilation hole pointed in the horizontal direction of the vehicle.

According to the vehicle of the sixth invention, the provision of the battery assembling body under the seat enables the ventilation hole to be located in a relatively high position from a road surface on the whole of the vehicle. Therefore, it is possible to prevent foreign matters such as water and dust from flowing into the battery in the housing from downward of the vehicle. On the other hand, if the ventilation hole is located upper part of the housing as described above, it is difficult to dispose the ventilation hole in the direction of the center tunnel which functions as a flow path of the outside air. Therefore, the ventilation hole is formed extending in the horizontal direction of the vehicle, thereby enabling the ventilation hole to be arranged in a portion relatively large as the internal space and enabling the outside air to be taken into the housing. Thereby, the provision of the ventilation hole located in the relatively high position of the vehicle prevents the inflow of foreign matters to the battery and enables the battery to be cooled down by supplying the ventilation space with the outside air.

DETAILED DESCRIPTION OF THE PREFERRED EMBODIMENTS

The preferred embodiments of a battery assembling body and a vehicle according to the present invention will now be described in detail hereinafter with reference to FIG. 1 to FIG. 5.

Figure 1:
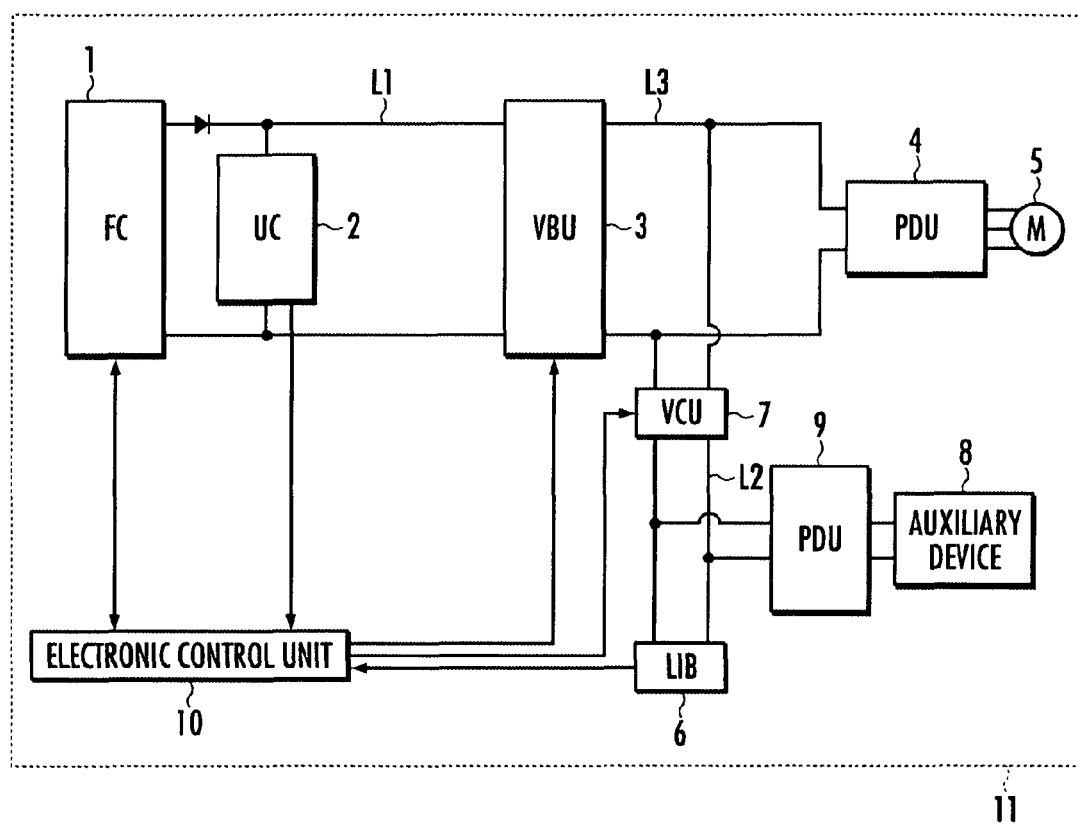
FIG. 1 is a general configuration diagram of a fuel cell power supply system mounted on a vehicle.

As shown in FIG. 1, a fuel cell power supply system mounted on a vehicle 11 of the present invention includes a fuel cell unit 1, an electric double layer capacitor 2 (hereinafter, simply referred to as "capacitor 2") connected in parallel to the fuel cell unit 1, a voltage boost unit 3 with an input section connected to the fuel cell unit 1 and the capacitor 2 and an output section connected to a motor 5 via a power drive unit (PDU) 4, and a bidirectional voltage conversion unit 7 (hereinafter, referred to as "voltage conversion unit 7") with an input section connected to the voltage boost unit 3 and an output section connected to a secondary battery unit 6 (a lithium-ion battery is used in this embodiment). The capacitor 2 and the secondary battery unit 6 correspond to a battery of the present invention.

The fuel cell unit 1 is composed of, for example, 250 fuel cell stacks connected in series and has an output voltage varying in a range of approx. 225V (output current: 0 A) to 180V (output current: 210 A). Moreover, the capacitor 2 is composed of a plurality of capacitor cells, which are not shown, and has an output voltage varying in a range around 200V (a range from approx. lower limit 154V to upper limit 243V). Further, the secondary battery unit 6 includes a plurality of secondary batteries (lithium ion batteries), which are not shown, connected to each other, and has an output voltage varying in a range of approx. 290V to 350V.

The voltage boost unit 3 is a DC-DC converter having a step-up ratio of 1.0 to 2.5 at rating of 100 kw and has at least a step-up function while a step-down function is added if necessary. The voltage conversion unit 7 is, for example, a DC-DC converter capable of increasing or decreasing a voltage, having a step-up ratio of 1.0 to 2.5 at rating of 10 kw.

Moreover, the fuel cell power supply system includes an auxiliary device 8 connected in parallel to the secondary battery unit 6 and the voltage conversion unit 7 between the secondary battery unit 6 and the voltage conversion unit 7. The auxiliary device 8 is a pump or the like for use in supplying the fuel cell unit 1 with a reaction gas such as a hydrogen gas and is connected to a second electric power supply line L2 directly connected to the secondary battery unit 6 and the voltage conversion unit 7 via a power drive unit (PDU) 9. In the fuel cell power supply system of this embodiment, an electric power supply line directly connected to the fuel cell unit 1 and the capacitor 2 is referred to as a first electric power supply line L1, an electric power supply line directly connected to the secondary battery unit 6 and the voltage conversion unit 7 is referred to as a second electric power supply line L2, and an electric power supply line whose voltage is increased from that of the first electric power supply line L1 by the voltage boost unit 3 is referred to as a third electric power supply line L3.

The fuel cell power supply system includes an electronic control unit 10. The electronic control unit 10 obtains detection signals of a voltage sensor and a current sensor, which are not shown, provided in each of the fuel cell unit 1 and the secondary battery unit 6 and detects voltages, currents, and electric power output from the fuel cell unit 1 and the secondary battery unit 6.

Further, the electronic control unit 10 is connected to a voltage sensor, which is connected to capacitor cells constituting the capacitor 2 to detect output voltages of the capacitor cells, and connected to a current sensor, which is provided at an end of the capacitor 2 to detect an output current of the capacitor 2, and thus detects output voltages of the capacitor cells, an output voltage of the entire capacitor 2 based on these output voltages, an output current of the entire capacitor 2, and an output power of the entire capacitor 2. Moreover, the electronic control unit 10 monitors output voltages of the capacitor cells.

Further, the electronic control unit 10 estimates an open-circuit voltage of the capacitor 2 from the output voltage and output current of the capacitor 2 and estimates a remaining capacity (hereinafter, referred to as "SOC") of the capacitor 2 with reference to a map and a data table (hereinafter, referred to as a map and the like) defining a relation between the estimated open-circuit voltage and SOC of the capacitor 2. Moreover, the electronic control unit 10 estimates an open-circuit voltage of the secondary battery from the output voltage and output current of the secondary battery unit 6 and estimates the SOC of the secondary battery unit 6 with reference to a map and the like defining a relation between the estimated open-circuit voltage and SOC of the secondary battery.

Still further, the electronic control unit 10 performs the operation control of the fuel cell unit 1 and the operation control of the voltage boost unit 3 or the voltage conversion unit 7 on the basis of the output of the fuel cell unit 1, the SOC of the capacitor 2, and the SOC of the secondary battery unit 6 to supply electric power from the fuel cell unit 1, the capacitor 2, and the secondary battery unit 6 to the motor 5 and to charge the capacitor 2 and the secondary battery unit 6 from the fuel cell unit 1.

Since the motor 5 functions as a generator when the vehicle 11 slows down, the electronic control unit 10 collects regenerative electric power generated by the motor 5 when the slowing-down of the vehicle 11 and charges the capacitor 2 and the secondary battery unit 6 with the regenerative electric power. In this instance, the electronic control unit 10 detects the regenerative electric power of the motor 5 by using a voltage sensor and a current sensor (not shown) provided in the PDU 4 and performs the operation control of the voltage boost unit 3 or the voltage conversion unit 7 to charge the capacitor 2 and the secondary battery unit 6 from the motor 5.

In the fuel cell power supply system of this embodiment, a diode D is provided between the fuel cell unit 1 and the voltage boost unit 3 and between the fuel cell unit 1 and the capacitor 2, and the diode D prevents an inflow of current to the fuel cell unit 1. Alternatively, it is possible to prevent the inflow of current to the fuel cell unit 1 by using another rectifier such as a transistor instead of the diode D or by connecting the capacitor 2 to the fuel cell unit 1 via a step-down unit (down converter).

The above described is the general configuration of the fuel cell power supply system mounted on the vehicle 11 in this embodiment. In this manner, the fuel cell power supply system of this embodiment includes the fuel cell unit 1 in addition to the secondary battery unit 6 and the capacitor 2, and the voltage boost unit 3 increases the voltage of the outputs from the fuel cell unit 1 and the capacitor 2, thereby enabling a reduction in the total output voltage of the fuel cell unit 1 and the capacitor 2 correspondingly. In addition, the secondary battery unit 6 supplies electric power to the motor 5 via the voltage conversion unit 7, and therefore the output power of the secondary battery unit 6 is available to assist the power supply from the fuel cell unit 1 and the capacitor 2 to the motor 5. Therefore, it is possible to make the power supplies 1, 2, and 6 assist or supplement each other so as to stably supply electric power to the motor 5 and it is possible to reduce the number of cells stacked in the fuel cell unit 1, the volume of the fuel cell unit 1, and the volume of the capacitor 2 or the secondary battery unit 6.

Figure 2:
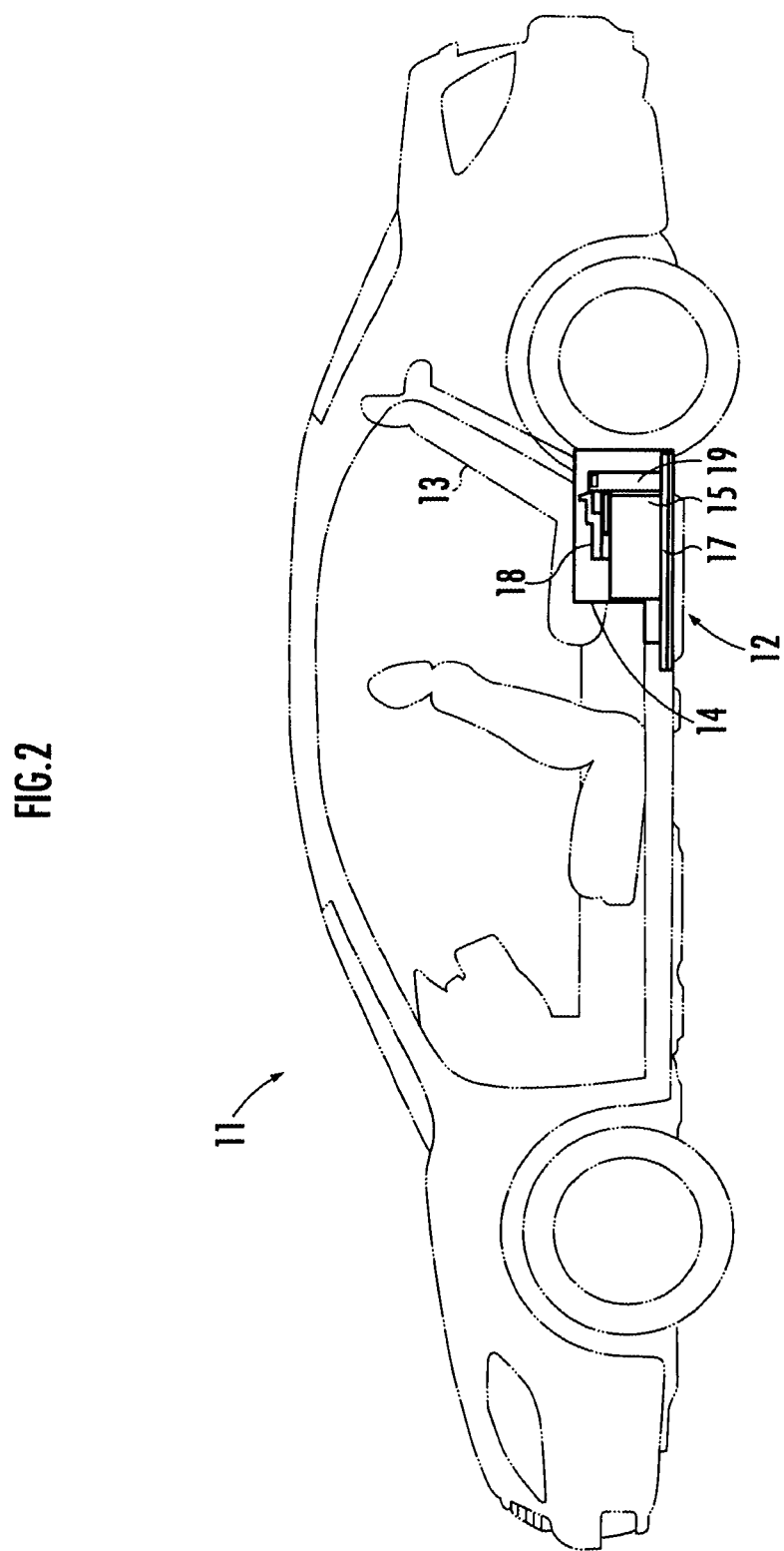
FIG. 2 is a partial cross section illustrating the place of a battery assembling body in the vehicle.
Figure 3:
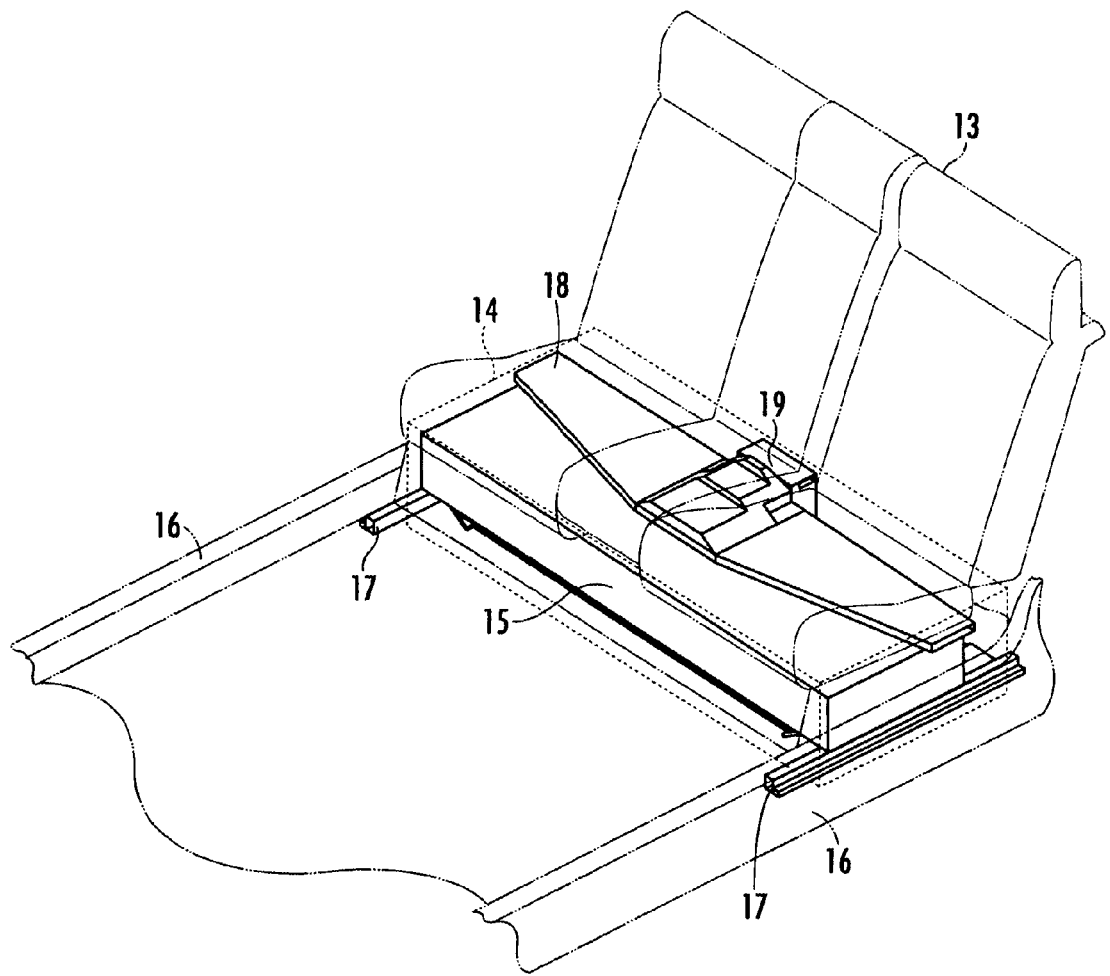
FIG. 3 is a perspective view corresponding to FIG. 2.
Figure 4:
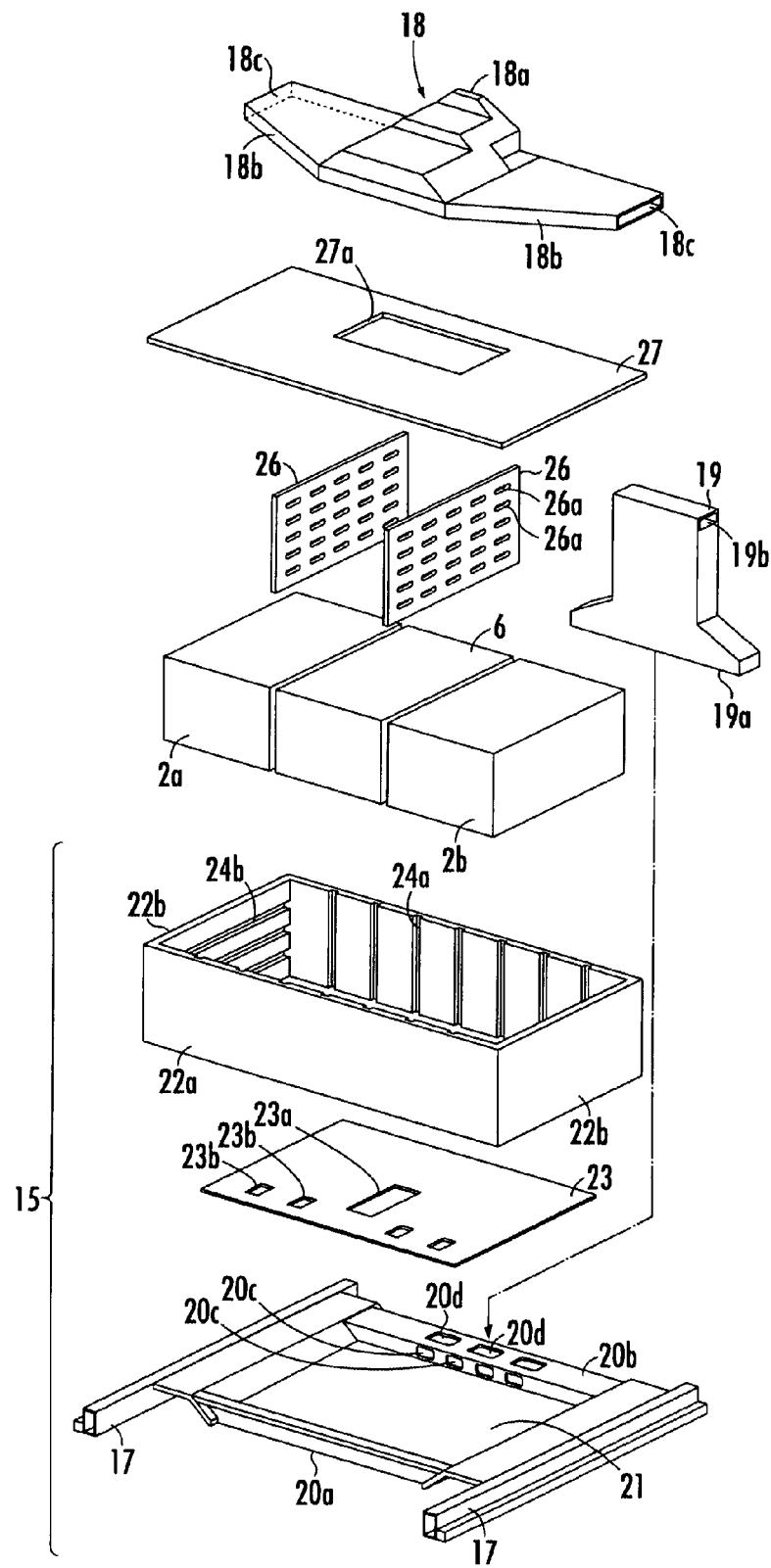
FIG. 4 is an exploded view of the battery assembling body.
Figure 5:
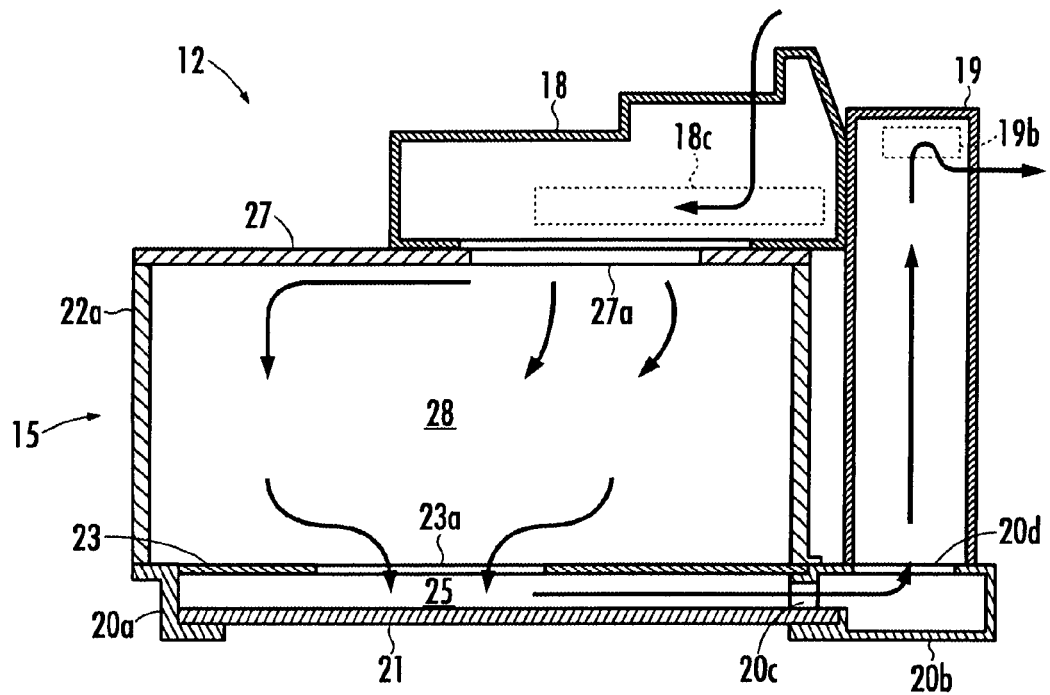
FIG. 5 is an explanatory cross section illustrating a flow of air.
Figure 5:
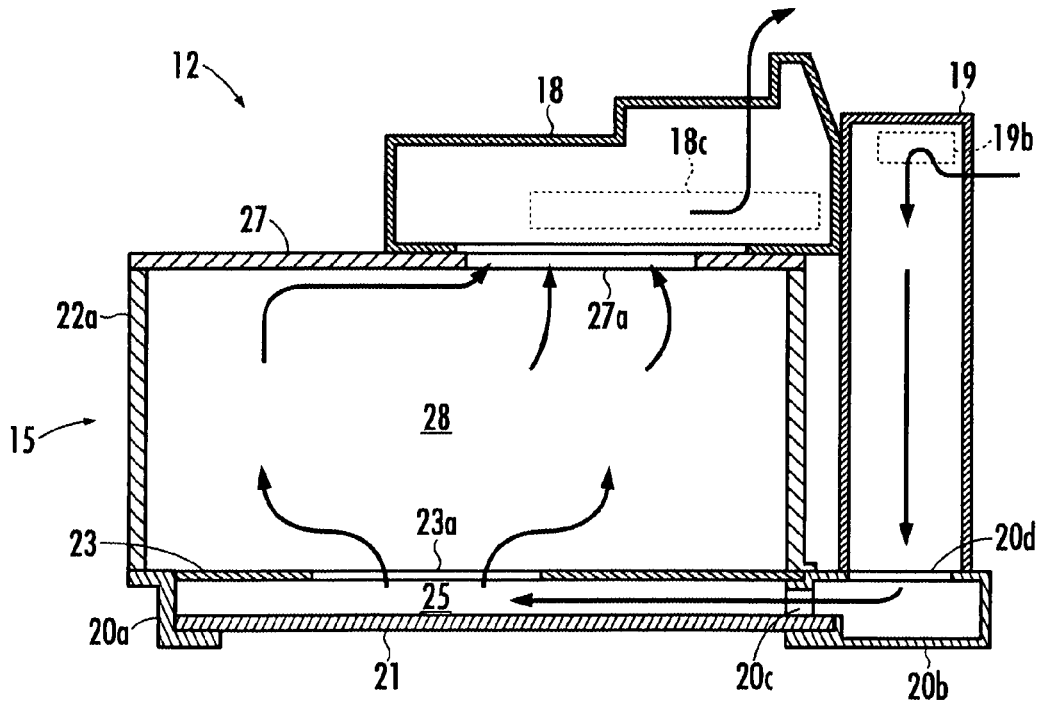

Subsequently, the specific configuration of a battery assembling body 12 of the present invention will be described with reference to FIG. 2 to FIG. 4. FIG. 2 shows a partial cross section illustrating the place of the battery assembling body 12 in the vehicle 11. FIG. 3 shows a perspective view corresponding to FIG. 2. FIG. 4 shows an exploded view of the battery assembling body 12.

As shown in FIG. 2, the battery assembling body 12 is mounted in an internal space 14 in an area under a rear seat 13.

As shown in FIG. 3, the battery assembling body 12 includes a housing 15 which contains the secondary battery unit 6 and the capacitor 2, a pair of side frames 17, 17 which enable the housing 15 to be detachably fitted to a bottom frame 16 of the vehicle 11 by means of a screw tool or the like which is not shown, a duct 18 located upper than the housing 15, and a fan 19 disposed on a lateral side of the housing.

As shown in FIG. 4, the lower part of the housing 15 includes the pair of side frames 17, 17, a pair of cross members 20a, 20b which connect the pair of side frames 17, 17 to each other, and a chamber 21 which closes a space enclosed by the side frames 17, 17 and the cross members 20a, 20b, and these components form a sealed state.

Note here that one cross member 20b is hollow with a first communication hole 20c formed in the internal surface of the cross member 20b and a second communication hole 20d formed in the top surface thereof.

The lateral portion of the housing 15 is formed by side walls 22a, 22a and 22b, 22b opposite to each other. The side walls 22a, 22a and 22b, 22b are disposed over the chamber 21 with a gap 25 (See FIG. 5: the gap 25 corresponds to a ventilation space of the present invention) formed by a gap forming member 23. The gap forming member 23 is a board supported by the pair of cross members 20a, 20b and has a plurality of openings 23a, 23b in communication with the gap 25.

Thereby, in the bottom of the housing 15, a battery mounting space 28 (See FIG. 5) is in communication with the gap 25 via the openings 23a, 23b, and the gap 25 is in communication with the fan 19 described later via the first communication hole 20c and the second communication hole 20d in the cross member 20b.

The side walls 22a, 22a and 22b, 22b disposed over the chamber 21 are disposed in such a way that the side walls 22a, 22a abut against the cross members 20a, 20b and that the side walls 22b, 22b abut against the internal surface of the side frames 17, 17, thereby sealing the portion between the bottom portion and the lateral portion of the housing 15.

Synthetic resin (rubber or the like) may be used to seal the portions between the members 17, 20 to 22, if necessary, to increase the sealability or waterproofness.

Moreover, regarding the side walls 22a, 22a and 22b, 22b, it is alternatively possible to form a partial side wall 22a detachably from other side walls 22b, 22b so that the secondary battery unit 6 and the capacitor 2 are attachable/detachable into/from the portion where the separated side wall 22a is detached.

Further, the side walls 22a and 22b each have a vertical vent groove 24a (which corresponds to the ventilation space of the present invention) extending in the vertical direction in the inner surface or a horizontal vent groove 24b (which corresponds to the ventilation space of the present invention) extending in the horizontal direction. The vertical vent groove 24a or the horizontal vent groove 24b functions as an air flow path when the housing 15 contains the secondary battery unit 6 and the capacitor 2.

As described above, the side walls of the battery are integrated with the side walls 22a and 22b of the housing 15, thereby enabling simplification of the configurations of the housing 15 and a battery casing while enabling the heat of the secondary battery unit 6 and the capacitors 2a and 2b to be relieved to the vertical vent groove 24a or the horizontal vent groove 24b formed on the side walls 22a and 22b.

The capacitor 2 contained in the housing 15 is composed of two physically divided box capacitors 2a and 2b, and each of the capacitors 2a and 2b contains a predetermined number of capacitor cells, which are not shown, connected to each other. On the other hand, the secondary battery unit 6 contains a predetermined number of secondary batteries, which are not shown, connected to each other. The capacitors 2a and 2b and the secondary battery unit 6 are contained in the housing 15 with the secondary battery unit 6 put between the two capacitors 2a and 2b.

A partition 26 is inserted between the secondary battery unit 6 and the capacitors 2a and 2b. The partition 26 is formed of a synthetic resin member having a predetermined thermal conductivity. The capacitors 2a and 2b are each arranged so as to be adjacent to the secondary battery unit 6 via the partition 26, by which the thermal conductivity between the capacitor 2a, 2b and the secondary battery unit 6 is set to a desired thermal conductivity (for example, a thermal conductivity on the order of 0.2 [W/m$^2$·K]). This enables the transmission of the heat in the secondary battery unit 6, which generally has a large heat amount caused by charging and discharging, to the capacitors 2a and 2b.

Moreover, a plurality of orifice 26a (which correspond to the ventilation space of the present invention) are formed in the partition 26, and it is possible to radiate the heat of the secondary battery unit 6 and the capacitors 2a and 2b via the orifice 26a when the housing 15 contains the secondary battery unit 6 and the capacitors 2a and 2b. Since the heat amount of the secondary battery unit 6 is larger than the heat amount of the capacitor 2 as described above, the heat radiated via the orifice 26a is mainly the heat from the secondary battery unit 6.

A narrow gap, which is not shown, is provided in one of the portion between the partition 26 and each of the capacitors 2a and 2b and the portion between the partition 26 and the secondary battery unit 6, and vertical ventilation is secured by using the narrow gap as a ventilation space. Similarly, a narrow gap may be provided between the side walls 22a, 22b and the capacitors 2a, 2b and between the side walls 22a, 22b and the secondary battery unit 6 to use the gap as a ventilation space.

A top cover 27 having an opening 27a in the center thereof is placed in the upper part of the housing 15 and a hollow duct 18 is provided on the top cover 27. The duct 18 has a duct body 18a in communication with the opening 27a of the top cover 27, wings 18b, 18b opposite to each other and extending from the duct body, and a ventilation hole 18c provided at the tip of each wing 18b. The wings 18b, 18b are horizontally extended from the center of the vehicle 11 with the ventilation holes 18c, 18c located at the left and right ends of the portion under the rear seat 13 (See FIG. 3).

Thereby, in the upper part of the housing 15, the battery mounting space 28 (See FIG. 5) is in communication with the inside of the duct 18 via the opening 27a of the top cover 27, and the inside of the duct 18 is opened to the outside via the ventilation holes 18c. Although the ventilation holes 18c may be opened to the interior of the vehicle 11, it is preferable to put the ventilation holes 18c in the inside of the rear seat 13 in consideration of the operating sound or the like of the fan 19.

Moreover, the lower part of the vehicle has a center tunnel or the like in the center thereof, and therefore it is difficult to provide a ventilation hole in the central location. The ventilation holes 18c extended in the horizontal direction of the vehicle 11, however, is located at the ends of the portion under the rear seat 13, and therefore there is no need to provide the internal space for the ventilation hole separately. In other words, this avoids a situation where an air supply and exhaust space decreases the interior space. Further, the portion under the rear seat 13 is located in the relatively high position from a road surface on the whole of the vehicle 11, and therefore even if the lower part of the vehicle 11 is submerged, it is possible to prevent water from flowing into the housing to make the battery submerged.

The fan 19 is an induced draft fan provided on the top of the cross member 20b, having an inlet port 19a covering the second communication holes 20d of the cross member 20b and an exhaust port 19b provided in the upper side surface of the fan 19.

The above described is a specific configuration of the battery assembling body 12 of the present invention.

According to the battery assembling body 12, the battery mounting space 28 in the housing 15 is in communication with the gap 25 via the opening 23a at the bottom of the battery mounting space 28, and the gap 25 is connected to the fan 19 via the first and second communication holes 20c and 20d of the cross member 20b, as shown in the partial cross sections of FIGS. 5(a) and 5(b). On the other hand, the battery mounting space 28 is in communication with the duct 18 via the opening 27a at the top of the battery mounting space 28, and the duct 18 is opened to the outside via the ventilation holes 18c.

Moreover, the vertical vent groove 24a and the horizontal vent groove 24b formed in the inner surface of the side walls 22a and 22b and the orifice 26a formed in the partition 26 function as air flow paths for the capacitors 2a and 2b and the secondary battery unit 6 placed in the battery mounting space 28.

This forms a series of circulation paths from the ventilation holes 18c to the battery mounting space 28 via the duct 18 and from the battery mounting space 28 to the fan 19 via the gap 25. Therefore, as shown by the arrows in FIG. 5(a), the operation of the fan 19 causes an outside air to be supplied from the ventilation holes 18c to the battery mounting space 28 via the duct 18 to cool the capacitors 2a and 2b and the secondary battery unit 6 and then the heated outside air is induced by the fan 19 from the gap 25 and is vented from the exhaust port 19b.

Alternatively, as shown by the arrows in FIG. 5(b), the fan 19 may be used as a forced draft fan to supply the outside air to the battery mounting space 28 from the gap 25 to cool the capacitors 2a and 2b and the secondary battery unit 6 and to vent the heated outside air from the ventilation hole 18c of the duct 18.

As described in detail hereinabove, according to the battery assembling body 12 of the present invention, the capacitors 2a and 2b and the secondary battery unit 6 are contained in the housing 15 and therefore it is possible to prevent an inflow of water, dust, and other foreign matters. Moreover, a series of circulation paths are formed in the housing 15, extending from the ventilation holes 18c to the battery mounting space 28 via the duct 18 and from the battery mounting space 28 to the fan 19 via the gap 25. Therefore, it is possible to relieve the heat of the capacitors 2a and 2b and the secondary battery unit 6 to the outside by using the circulation paths. Moreover, it is possible to vent the air heated by the capacitors 2a and 2b and the secondary battery unit 6 via the circulation paths and to cool the capacitors 2a and 2b and the secondary battery unit 6 by supplying the circulation paths with an outside air or other cooling mediums. This enables the prevention of a temperature rise of the capacitors 2a and 2b and the secondary battery unit 6 (battery) while preventing the inflow of foreign matters.

Moreover, it is possible to secure a mounting space for the capacitors 2a and 2b and the secondary battery unit 6 by effectively using the area enclosed by the cross members 20a, 20b and the side frames 17, 17 to form the housing 15 in the area. Further, one cross member 20b is hollow so as to function as a duct connecting the gap 25 and the fan 19, thereby enabling space saving of the entire battery assembling body 12.

Although the side walls 22a and 22b of the housing 15 have been formed in common with the side walls of the capacitors 2a and 2b and the secondary battery unit 6 in this embodiment, the present invention is not limited thereto, but battery side walls, which enclose the capacitors 2a and 2b and the secondary battery unit 6, may be provided separately. In this instance, it is possible to use a space generated between the battery side walls and the side walls 22a and 22b of the housing 15 as a ventilation space. Further, in this instance, it is preferable to form orifice in the battery side walls to encourage heat radiation and ventilation to the ventilation space.

Moreover, a plurality of orifice 26a have been formed in the partition 26 between the secondary battery unit 6 and the capacitors 2a and 2b in this embodiment, alternatively it is possible to form a plurality of vent grooves in addition to or instead of the orifice 26a.

Further, although this embodiment has been described for a case where the battery of the present invention is composed of the secondary battery unit 6 and the capacitors 2a and 2b which constitute the fuel cell power supply system, the present invention is not limited thereto, but the battery may be composed of one of the secondary battery unit and the capacitor and may be composed of any other rechargeable battery.

Still further, although this embodiment has been described taking a four-wheel car as a vehicle for instance, the vehicle is not limited thereto, but may be a two-wheeled vehicle or a railway vehicle.

We claim:

1. A battery assembling body, comprising:
   a plurality of batteries that are layered, wherein the plurality of batteries comprise a pair of batteries disposed at end portions in the layered direction and an intermediate battery disposed between the pair of batteries disposed at the end portions;
   a housing which contains the battery and is disposed in an internal space in a lower part of a vehicle into which an outside air is likely to flow;
   an assembling part which is used to detachably fit the housing into the internal space;
   a ventilation hole located in an upper part of the housing; and
   a ventilation space which is formed between the pair of batteries disposed at the end portions in the layered direction and a side wall of the housing directly facing the battery disposed at one of the end portions in the layered direction,
   wherein the ventilation space is in communication with the ventilation hole.

2. The battery assembling body according to claim 1, further comprising a gap forming member which forms a gap, as a part of the ventilation space, between the battery contained in the housing and a lower part of the housing.

3. The battery assembling body according to claim 1, wherein:
   the battery assembling body includes a secondary battery unit as the intermediate battery composed of a plurality of secondary batteries connected to each other, and a capacitor as the pair of batteries each composed of a plurality of capacitor cells connected to each other; and
   a partition is inserted between the secondary battery unit and the capacitor adjacent to each other and one or both of an orifice and a vent groove are formed in the partition as a part of the ventilation space.

4. The battery assembling body according to claim 1, wherein a vent groove is formed as a part of the ventilation space in a side wall of the housing in contact with the side of the battery.

5. The battery assembling body according to claim 1, further comprising a fan which induces an inflow of an outside air to the ventilation space.

6. A vehicle on which the battery assembling body according to claim 1 is mounted, wherein the internal space is formed under a seat of the vehicle and at an end of a center tunnel extending in an anteroposterior direction in the center of the vehicle, with the ventilation hole pointed in the horizontal direction of the vehicle.

7. The battery assembling body according to claim 1,
   wherein the housing is composed of side walls surrounding the battery, the battery is housed in a space formed by the side walls, and the ventilation space is provided between the side walls and the battery,
   wherein a vent groove is formed as a part of the ventilation space in a side wall of the housing in contact with the side of the battery, and
   wherein the side walls are composed of side walls having vertical grooves and side walls having horizontal grooves extending in a direction crossing the vertical grooves.

8. The battery assembling body according to claim 1, wherein the ventilation hole is a refrigerant inlet or a refrigerant outlet, and the refrigerant inlet and the refrigerant outlet are both located at the upper part of the housing.

9. The battery assembling body according to claim 8, wherein both of the refrigerant inlet and the refrigerant outlet are opened toward both sides in a width direction of the vehicle.

10. The battery assembling body according to claim 9, wherein positions of the refrigerant inlet and the refrigerant outlet in the width direction of the vehicle deviates from each other.

\* \* \* \* \*